(12) United States Patent
Gretz

(10) Patent No.: US 6,222,128 B1
(45) Date of Patent: Apr. 24, 2001

(54) CABLE SUPPORT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/295,082

(22) Filed: Apr. 20, 1999

(51) Int. Cl.[7] .................................................. H02G 3/10
(52) U.S. Cl. ................... 174/72 A; 174/135; 24/16 PB; 24/30.5 P; 248/62; 248/74.3
(58) Field of Search ...................... 174/72 A, 135; 248/62, 74, 74.3; 24/16 PB, 17 AP, 30.5 P, 269

(56) References Cited

U.S. PATENT DOCUMENTS

| | | | |
|---|---|---|---|
| 229,699 | * 7/1880 | Hale | 24/73 |
| 520,145 | * 5/1894 | Newman | 24/73 |
| 2,491,290 | * 12/1949 | Tinnerman | 24/73 |
| 2,937,834 | * 5/1960 | Orenick et al. | 248/71 |
| 3,139,253 | * 6/1964 | Crawford et al. | 248/74 |
| 3,210,033 | * 10/1965 | Deardorf | 248/74 |
| 3,269,680 | * 8/1966 | Bryant | 248/73 |
| 3,275,969 | * 9/1966 | Sheeran | 339/103 |
| 3,363,293 | * 1/1968 | Nemrod et al. | 24/30.5 |
| 3,471,109 | * 10/1969 | Meyer | 248/68 |
| 3,542,321 | * 11/1970 | Kahabka | 248/68 |
| 3,765,694 | * 10/1973 | Allsop | 280/11.35 N |
| 3,837,101 | * 9/1974 | Young | 40/21 |
| 4,924,557 | * 5/1990 | Heckerman et al. | 24/16 PB |
| 5,825,009 | * 10/1998 | James et al. | 174/135 |
| 6,073,315 | * 6/2000 | Rasmussen | 24/16 PB |
| 6,087,593 | * 7/2000 | Skipworth et al. | 174/135 |

* cited by examiner

*Primary Examiner*—Dean A. Reichard
*Assistant Examiner*—Adolfo Nino

(57) ABSTRACT

An integral or unitary flexible cable support with a base for mounting on an appropriate structural member, a flexible strap integrally formed with the base, the flexible strap having a base end attached to the base and a distal end that includes a keyhole shaped aperture for engaging an appropriate attachment button on the front side of the base. In use, cable or wiring to be supported is placed within the flexible strap, the strap bent to encompass the wiring and the keyhole shaped aperture engaged about the attachment button to provide a wiring support that is not easily disengaged by random movement of the wiring, but is easily disengaged by hand for removal of one or more cables or insertion of additional cables.

9 Claims, 1 Drawing Sheet

CABLE SUPPORT

FIELD OF THE INVENTION

The present invention relates to a communications cable support useful for the easy, safe and secure installation of such cables, including fiber optic cable.

BACKGROUND OF THE INVENTION

With the advent and growth of computer and communications applications in the business environment, the retrofit installation of delicate and sophisticated cabling such as twisted pair and fiber optic cables has become more and more of an issue. Unlike conventional electrical wiring, such cabling cannot be abused either in its installation or use. Bending excessively, kinking, sharp bending, contact with sharp edges, etc. all can cause harm to the cable which affects its intended performance. This problem is not quite so significant in new construction where cable trays designed to receive such cabling are installed during construction to accommodate current and future needs. In retrofit applications, however, means must be provided for the easy, safe and secure installation and maintenance of such cabling.

Accordingly, a number of hangers or supports for such cabling have been designed and marketed primarily for the retrofit market. For example, U.S. Pat. No. 5,740,994 describes a cable support which is generally J-shaped and has a saddle portion which is curved around the base of the J and flat across the base of the J. Downward extending flanges on either side of the flat base of the J are provided to ease the transition of a sagging cable suspended between two such supports as the cable is laid from one side of the support, across the flat portion of the support and off of the other side thereof While this structure is useful, the presence of the flat base can still result in excessive bending of the cabling and the curved portion of the saddle all but forces the individual cables into contact with one another. Such a condition is generally considered undesirable because of the potential for interference between abutting cables. Additionally, use of the cable support described in this patent requires the use of a separate cable tie across the open face of the J to secure the cable after installation.

A variety of flexible such supports have also been suggested for such use. One such device is manufactured and sold by Caddy Fasteners of Solon, Ohio. This device utilizes a flexible strap having one end thereof attached to a mounting base and the opposing or free end thereof including a rigid cross member whose exposed ends engage tabs on the mounting base when the flexible strap is folded upon itself to encompass inserted wiring. In order to tightly secure the strap to the mounting base, crimping of the mounting base incorporated tabs is necessary. While such crimping provides a secure closure of the support, removal of a wire or the insertion of another wire or wires is made more complicated by the need to "uncrimp" the tabs to permit removal of the flexible strap.

OBJECTS OF THE INVENTION

It is an object of the present invention to provide a flexible cable support structure that provides an integral cable support with rapid and easy securing of the flexible strap to its mounting without the need for crimping or other additional installation steps.

It is a further object of the present invention to provide a flexible cable support structure that provides a secure mounting for cables or wiring that can be readily disassembled for removal of one or more wires or the insertion of additional wires without the need to "uncrimp" or otherwise perform additional operations to unfasten the support.

SUMMARY OF THE INVENTION

According to the present invention, there is provided an integral or unitary flexible cable support comprising a base for mounting on an appropriate structural member, a flexible strap integrally formed with the base, the flexible strap having a base end attached to the base and a distal end that includes a keyhole shaped aperture for engaging an appropriate attachment button on the front side of the base. In use, wiring to be supported is placed within the flexible strap, the strap bent to encompass the wiring and the keyhole shaped aperture engaged about the attachment button thereby providing a wiring support that is not easily disengaged by random movement of the wiring, but is easily disengaged by hand for removal of one or more wires or insertion of additional wires.

DETAILED DESCRIPTION

Figure 1:
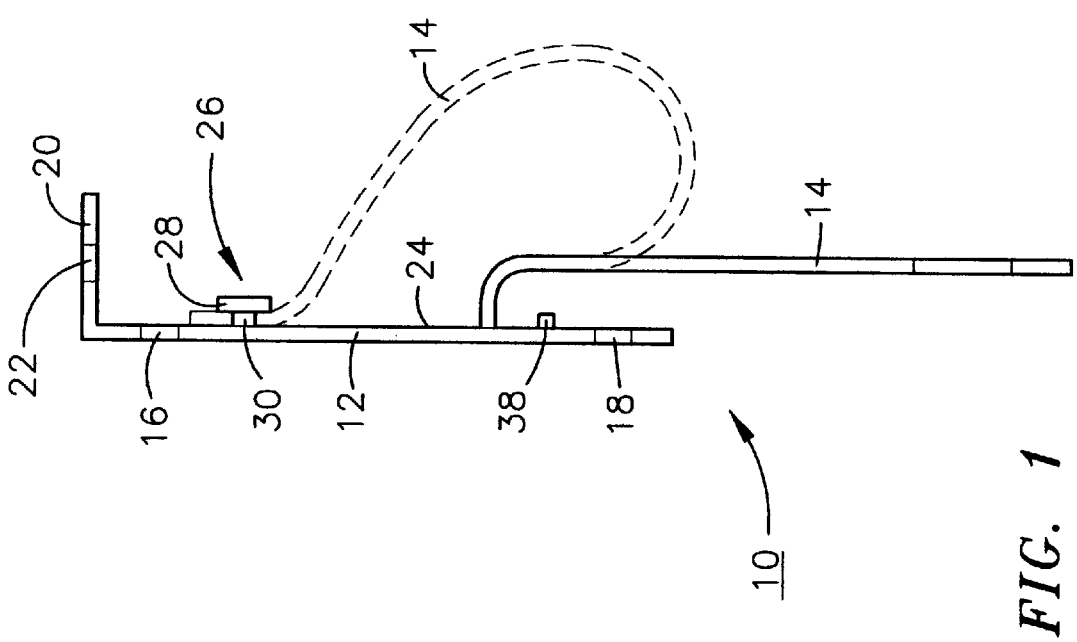
FIG. 1 is a partially phantom side view of the cable support of the present invention.

As shown in FIG. 1 the cable support 10 of the present invention comprises a base 12, having integrally formed therewith or permanently attached thereto, flexable strap 14 having an end attached to the base 12. Base 12 includes apertures 16 and 18 for attaching base 12 and consequently cable support 10 to a surface, stud or other structural member. According to the preferred embodiment depicted in FIG. 1, base 12 includes a flange 20 having an aperture 22 therein for mounting of cable support 10 to a ceiling or other overhead horizontal structure. It should be noted that flange 20 may be substituted with any number of alternative structures as have been used to attach similar cable support elements to a variety of structural members and that flange 20 is merely representative of one embodiment of these various attachment means.

On the front surface 24 of base 12 is a button fastener 26 having a head portion 28 and a post portion 30. The roles of these two portions will be explained more fully below.

Figure 2:
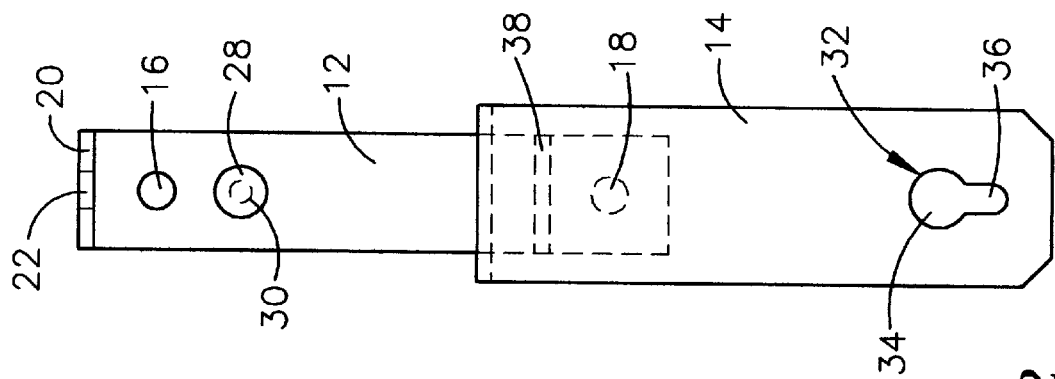
FIG. 2 is a front view of the cable support of the present invention.

As best seen in FIG. 2, strap 14 includes near its distal end keyhole-shaped aperture 32 having a wide portion 34 and a narrow portion 36. When strap 14 is flexed to provide a support or cradle for enclosed cable as shown in phantom in FIG. 1, wide portion 34 of keyhole-shaped aperture 32 is passes over head 28 and as weight is applied downward to strap 14, narrow portion 36 engages post 30. In this position, strap 14 can only be disengaged from head 28 by aligning wide portion 34 so that it fits over head 28. By proper sizing of head 28, post 30 and wide and narrow portions 34 and 36, this operation can only occur by careful manipulation of strap 14 and will not be initiated by random movement of strap 14 relative to post 30 and head 28.

According to a preferred embodiment, strap 14 is made of nylon and most preferably of nylon of a thickness of from about 0.025" to about 0.060". Nylon materials of this thickness while being flexible provide sufficient rigidity to assure retention of engagement of aperture 32 with post and head 30 and 28 even when only a minimum of weight is applied to strap 14 by cable enclosed therein.

According to a further preferred embodiment, base 12 includes on front surface 24 a stiffening flange 38 which assists in maintaining the planarity of base 12 and consequently the flatness of strap 14 when unequal forces are applied to strap 14 by enclosed, suspended cables.

As the invention has been described, it will be apparent to those skilled in the art that the same may be varied in many ways without departing from the spirit and scope thereof. Any and all such modifications are intended to be included within the scope of the appended claims.

What is claimed is:

1. An integral cable support structure comprising:
   A) a base having a front surface;
   B) a flexible strap having a base end attached to said front surface and a distal end;
   C) a keyhole-shaped aperture including a wide portion and a narrow portion near said distal end; and
   D) a fastener button on said front surface comprising a post attached to said front surface and a ahead atop said post, said head being of a greater diameter than said post;

said wide portion being of a size that it passes over said head when said strap is bent upon itself and said narrow portion engages said post when weight is applied to said strap bent upon itself.

2. The integral cable support structure of claim 1 further including a device for attaching said base to an overhead structural member.

3. The integral cable support structure of claim 2 wherein said device comprises a flange extending at a right angle from said base and including an appropriate aperture for insertion of a fastener.

4. The integral cable support structure of claim 1 further including a reinforcing flange across said front surface.

5. The integral cable support structure of claim 1 wherein said integral cable support structure is nylon.

6. The integral cable support structure of claim 5 wherein said strap has a thickness of between about 0.025 and about 0.060 inches.

7. The integral cable support structure of claim 5 further including a device for attaching said base to an overhead structural member.

8. The integral cable support structure of claim 7 wherein said device comprises a flange extending at a right angle from said base and including an appropriate aperture for insertion of a fastener.

9. The integral cable support structure of claim 5 further including a reinforcing flange across said front surface.

\* \* \* \* \*